United States Patent
Kikuzuki

(10) Patent No.: US 9,344,370 B2
(45) Date of Patent: May 17, 2016

(54) COMMUNICATION APPARATUS, WIRELESS COMMUNICATION NETWORK SYSTEM, AND COMMUNICATION METHOD

(71) Applicant: FUJITSU LIMITED, Kawasaki-shi, Kanagawa (JP)

(72) Inventor: Tatsuya Kikuzuki, Sodegaura (JP)

(73) Assignee: Fujitsu Limited, Kawasaki (JP)

( * ) Notice: Subject to any disclaimer, the term of this patent is extended or adjusted under 35 U.S.C. 154(b) by 89 days.

(21) Appl. No.: 14/203,159

(22) Filed: Mar. 10, 2014

(65) Prior Publication Data

US 2014/0313903 A1    Oct. 23, 2014

(30) Foreign Application Priority Data

Apr. 23, 2013 (JP) ................. 2013-090420

(51) Int. Cl.
  *H04L 12/803* (2013.01)
  *H04L 12/725* (2013.01)
  *H04L 12/801* (2013.01)
  *H04L 12/727* (2013.01)
  *H04L 12/707* (2013.01)

(52) U.S. Cl.
  CPC ............ *H04L 47/122* (2013.01); *H04L 45/302* (2013.01); *H04L 47/14* (2013.01); *H04L 45/121* (2013.01); *H04L 45/24* (2013.01)

(58) Field of Classification Search
  CPC ..... H04L 47/122; H04L 45/302; H04L 47/14; H04L 45/24; H04L 45/121
  See application file for complete search history.

(56) References Cited

U.S. PATENT DOCUMENTS

| | | | |
|---|---|---|---|
| 8,416,763 B1 * | 4/2013 | Montini ............... | H04J 3/0667 370/350 |
| 2001/0038610 A1 * | 11/2001 | Decker et al. ................. | 370/230 |
| 2002/0186665 A1 * | 12/2002 | Chaffee .................. | H04L 45/00 370/255 |
| 2007/0195713 A1 | 8/2007 | Khan et al. | |

FOREIGN PATENT DOCUMENTS

| | | |
|---|---|---|
| JP | 2007-228083 A | 9/2007 |
| JP | 2008-067066 A | 3/2008 |
| JP | 2011-055208 A | 3/2011 |

* cited by examiner

*Primary Examiner* — Mohammad Anwar
(74) *Attorney, Agent, or Firm* — Arent Fox LLP

(57) ABSTRACT

A communication apparatus includes: a judgment section configured to judge a request for delay guarantee for data transmission; a route selection section configured to: select a first route including a mean delay time meeting a first condition, from routes available between the communication apparatus and a second communication apparatus which are in a network of wireless communication, when the request is a first request; and select a second route including a probability of successful data transmission for a given number of transmissions meeting a second condition, from the routes, when the request is a second request; and a transmission section configured to transmit the data to one of the first route and the second route.

17 Claims, 10 Drawing Sheets

COMMUNICATION APPARATUS, WIRELESS COMMUNICATION NETWORK SYSTEM, AND COMMUNICATION METHOD

CROSS-REFERENCE TO RELATED APPLICATION

This application is based upon and claims the benefit of priority from the prior Japanese Patent Application No. 2013-090420 filed on Apr. 23, 2013, the entire contents of which are incorporated herein by reference.

FIELD

The embodiment discussed herein is related to a communication apparatus, wireless communication network system, and communication method.

BACKGROUND

Various route search techniques are used by wireless communication systems including multihop communication systems. A route search technique, for example, defines a link cost and selects a route whose sum of link costs is the lowest of all the routes.

Related art is discussed in Japanese Laid-open Patent Publication No. 2011-55208, Japanese Laid-open Patent Publication No. 2007-228083 or Japanese Laid-open Patent Publication No. 2008-67066.

SUMMARY

According to an aspect of the embodiments, a communication apparatus includes: a judgment section configured to judge a request for delay guarantee for data transmission; a route selection section configured to: select a first route including a mean delay time meeting a first condition, from routes available between the communication apparatus and a second communication apparatus which are in a network of wireless communication, when the request is a first request; and select a second route including a probability of successful data transmission for a given number of transmissions meeting a second condition, from the routes, when the request is a second request; and a transmission section configured to transmit the data to one of the first route and the second route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
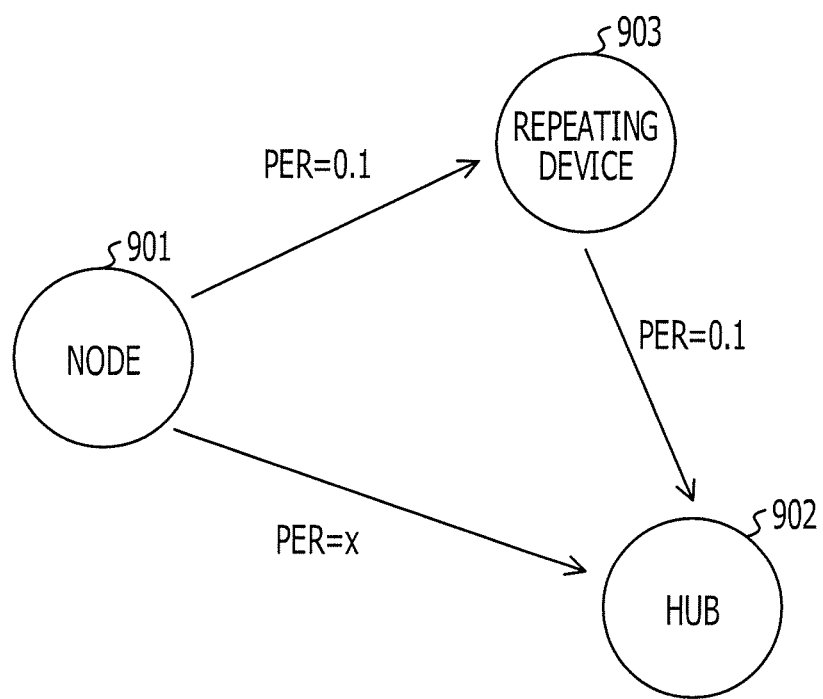
FIG. 1 is an explanatory diagram of an example of PER of a multihop network.

A minimum link cost is determined to suit a combination of independent link set complexity and mean distance between terminals, and that a routing management unit finds an independent link set excluding links whose link cost is the minimum or less. This related art reduces delay attributable to links with poor transmission quality, thus ensuring stable network coding information transfer.

A node apparatus includes a neighbor management unit and a routing table management unit. The neighbor management unit manages a plurality of neighbor routes to a communication node reached by a specific number of hops equal to 1 or greater. The routing table management unit has a routing table used to conduct routing in a network. The node apparatus includes a multipath construction unit. The multipath construction unit identifies, from among a plurality of neighbor routes managed by the neighbor management unit, a neighbor route to a specific node reached by a specific number of hops from an own node on a standard route when the number of hops from a data source node or a data destination node to the own node on the standard route is a multiple of the specific number of hops. Further, the multipath construction unit constructs a reserve route by adding the identified neighbor route to a routing table. The node apparatus further includes an application data communication unit. The application data communication unit judges, based on data application type, whether or not to construct the reserve route. The multipath construction unit constructs a reserve route when the application data communication unit judges that a reserve route is constructed.

A wireless network system includes a plurality of base stations and a plurality of wireless apparatuses. Each of the plurality of base stations has wireless systems different from each other and communicates wirelessly using the wireless systems of its own. Each of the plurality of wireless apparatuses has a plurality of wireless systems and a multihop wireless system and accesses a desired base station of all the plurality of base stations using at least one of the wireless systems selected from among the plurality of wireless systems and the multihop wireless system. If the n (where n is an integer equal to 3 or greater) wireless apparatuses from the plurality of wireless apparatuses communicate wirelessly with each of the plurality of base stations through a plurality of wireless communication routes using at least one of the wireless systems and the multihop wireless system, each of the plurality of base stations controls a specific wireless apparatus of the n wireless apparatuses in such a manner as to maintain a wireless communication throughput using a plurality of wireless communication routes and perform a route switching process. The route switching process is designed to relatively reduce delay time of wireless communication using the plurality of wireless communication routes. The specific wireless apparatus performs the route switching process in accordance with control exercised by the base station.

It may be desirable to apply a different type of request for delay guarantee in accordance with the packet to be transmitted. For example, a probable case would be that, in the case of an urgent packet, delay guarantee is conducted in such a manner as to minimize significant delay by reducing delay distribution, and that, in the case of a packet exclusive of urgent packet, delay guarantee is conducted in such a manner as to decrease mean delay.

Mean delay tends to increase as the number of hops increases. Therefore, the smaller the number of hops, the smaller mean delay. On the other hand, delay distribution tends to decrease as the number of hops increases. Therefore, the larger the number of hops, the smaller delay distribution.

When the request for delay guarantee is "mean delay reduction," for example, high throughput, it is recommendable to select a route with a smaller number of hops. However, when the request for delay guarantee is "significant packet delay reduction," it is more likely that large delay may occur if delay distribution increases as a result of decreasing the number of hops. Therefore, a route that reduces significant packet delay may be different from a route that decreases mean delay.

As illustrated in FIG. 1, for example, a PER (Packet Error Ratio) between a node device 901 and a repeating device 903 and a PER between a hub device 902 and the repeating device 903 may be both "0.1" in the multihop network. For example, the PER between the node device 901 and the hub device 902 may be a variable x. A description will be given below of the comparison between a case with the mean delay and the probability of occurrence of five errors for direct packet transmission from the node device 901 to the hub device 902 and a case with the mean delay and the probability of occurrence of five errors for packet transmission by way of the repeating device 903. In the description given below and the accompanying drawings, the node device and the hub device may be denoted as the "node" and the "hub," respectively.

Figure 2:
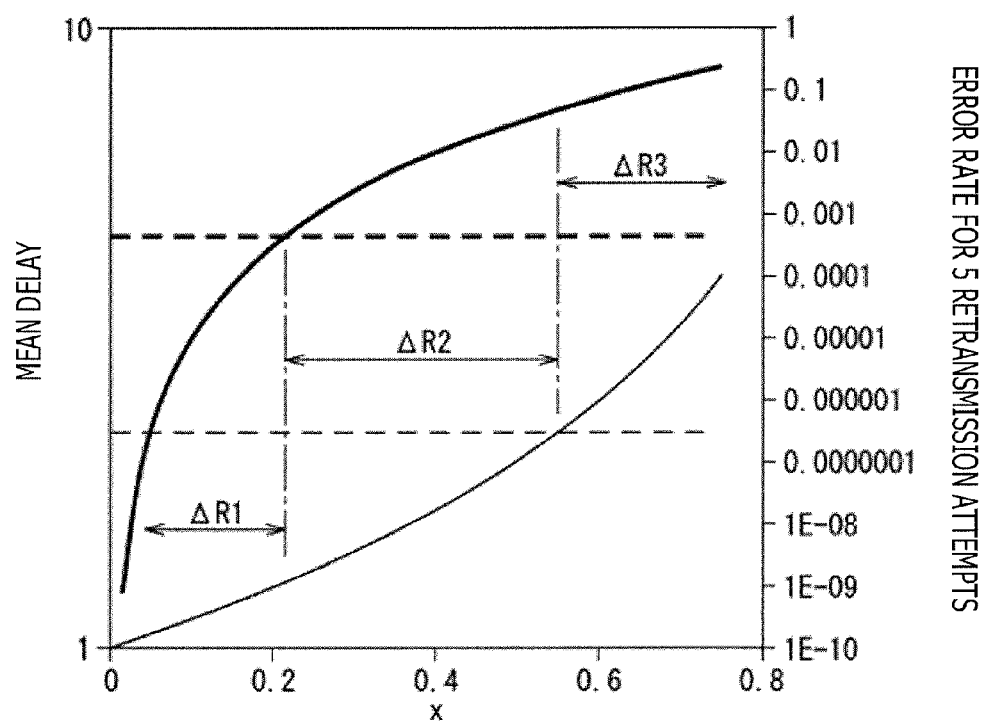
FIG. 2 is a graph illustrating mean delay and probability of occurrence of five errors.

FIG. 2 is a graph illustrating mean delay and probability of occurrence of five errors. The horizontal axis represents the PER "x" between the node device 901 and the hub device 902, the vertical axis on the left represents the mean delay, and the vertical axis on the right represents the probability of occurrence of five errors. The mean delay value is a relative value which becomes "1" when transfer is successful by a single hop.

The fine solid line represents the mean delay for direct packet transmission from the node device 901 to the hub device 902. The bold solid line represents the probability of occurrence of five errors for direct packet transmission from the node device 901 to the hub device 902. The fine dotted line represents the mean delay for packet transmission by way of the repeating device 903. The bold dotted line represents the probability of occurrence of five errors for packet transmission by way of the repeating device 903.

In a range $\Delta R1$, the mean delay and a probability of occurrence of error are both smaller for direct packet transmission from the node device 901 to the hub device 902 than for packet transmission by way of the repeating device 903. In a range $\Delta R3$, the mean delay and the probability of occurrence of error are both smaller for packet transmission by way of the repeating device 903 than for direct packet transmission from the node device 901 to the hub device 902.

In a range $\Delta R2$, the mean delay is smaller for direct packet transmission from the node device 901 to the hub device 902 than for packet transmission by way of the repeating device 903. On the other hand, the probability of occurrence of error is smaller for packet transmission by way of the repeating device 903 than for direct packet transmission from the node device 901 to the hub device 902. For example, a route that decreases the mean delay is a route that bypasses the repeating device 903, and a route that reduces significant packet delay is a route that passes through the repeating device 903, indicating that the two routes are different.

<Configuration Diagram of Communication System>

Figure 3:
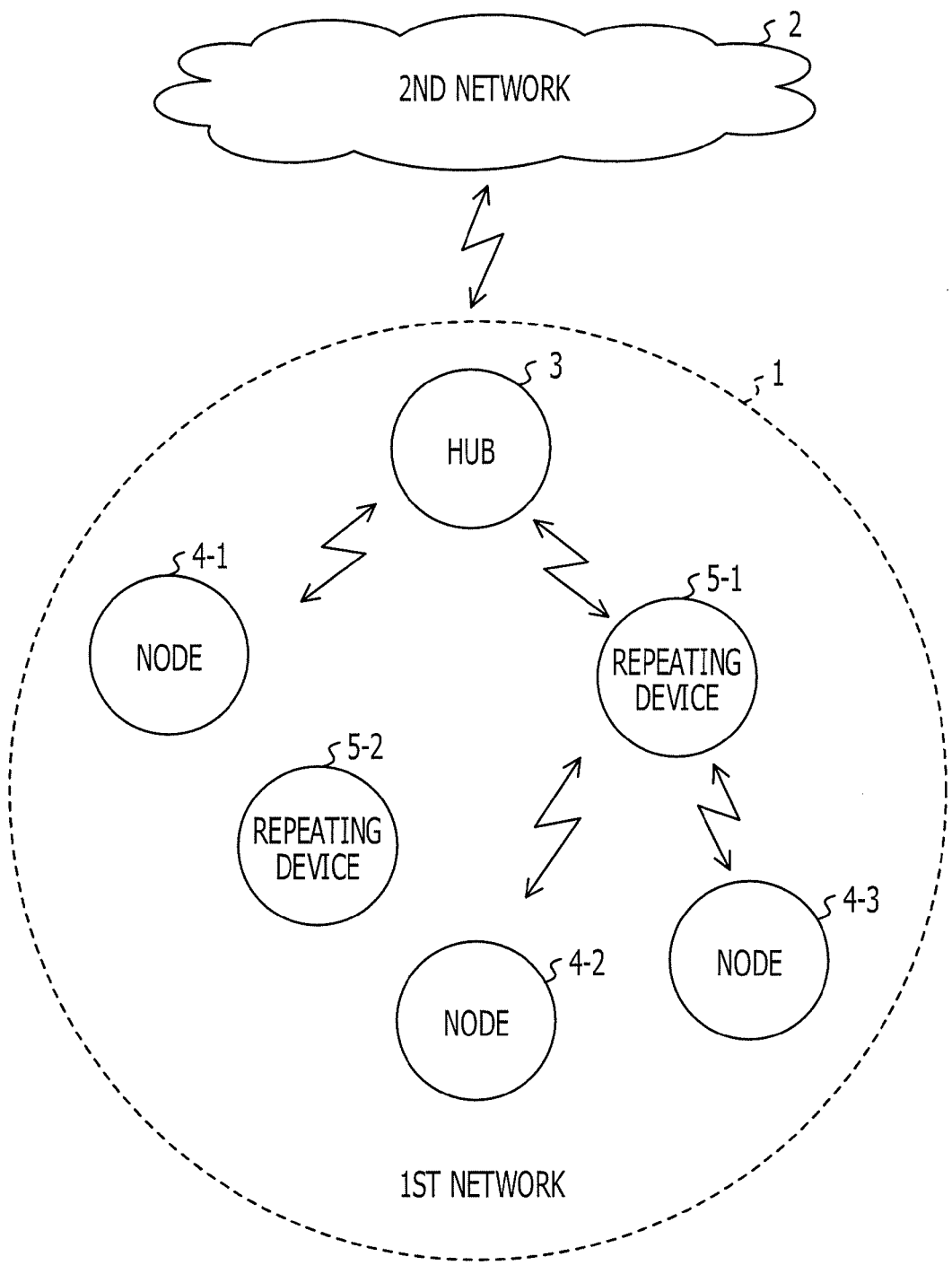
FIG. 3 is an explanatory diagram of a configuration example of a communication system.

An execution example will be described below with reference to the accompanying drawings. FIG. 3 is an explanatory diagram of a configuration example of a communication system. As illustrated in FIG. 3, a first network 1 and a second network 2 are coupled via a hub 3. The first network 1 is a multihop network that includes the hub 3, nodes 4-1 to 4-3, and repeating devices 5-1 and 5-2. In the description given below, the nodes 4-1 to 4-3 may be collectively denoted as the "nodes 4." The repeating devices 5-1 and 5-2 may be collectively denoted as the "repeating devices 5."

The nodes 4 transmit data to the hub 3 through multihop communication. The hub 3 transfers the data, collected from the nodes 4, to other communication apparatus via the second network 2. The repeating devices 5 relay multihop communication between the nodes 4 and the hub 3. Each of the nodes 4 may function as one of the repeating devices 5 that relays multihop communication of the other nodes 4.

For example, the first network 1 may be a BAN (Body Area Network) standardized by IEEE (Institute of Electrical and Electronic Engineers) 802.15.6, Bluetooth (registered trademark) or Zig bee (registered trademark). For example, the second network 2 may be a WLAN (Wireless Local Area Network) standardized by IEEE802.11 or a WiMAX (Worldwide Interoperability for Microwave Access) network.

<Functional Configuration>

Figure 4:
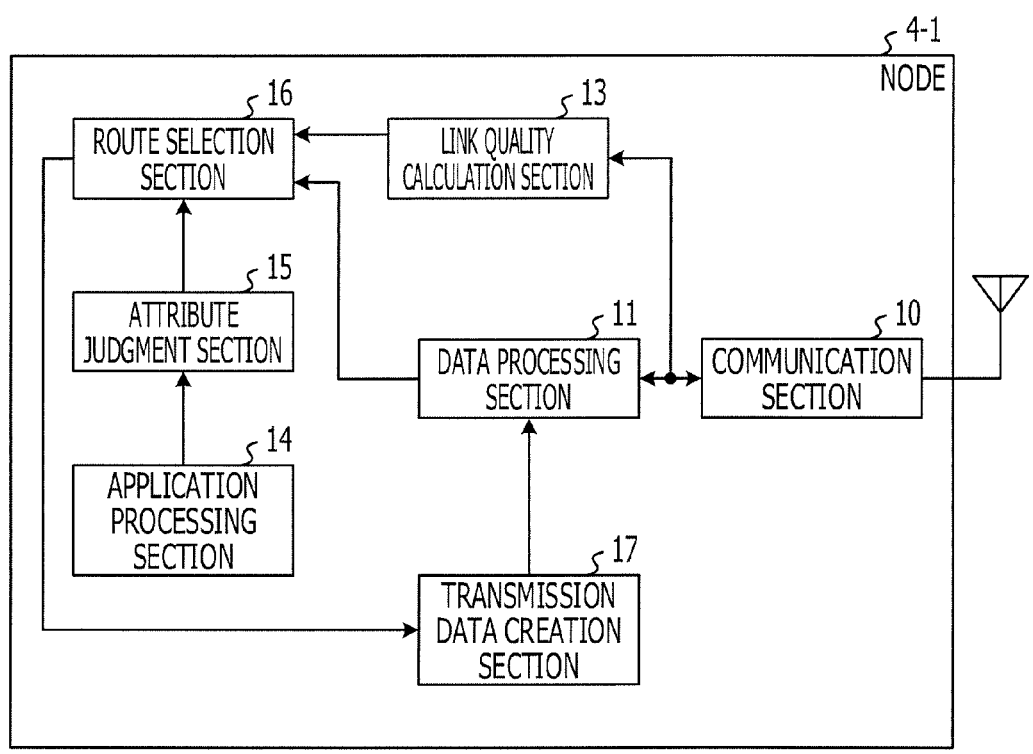
FIG. 4 is an explanatory diagram of an example of functional configuration of a node.

FIG. 4 is an explanatory diagram of an example of functional configuration of a node. The node illustrated in FIG. 4 may be the node 4-1 illustrated in FIG. 3. The other nodes 4-2 and 4-3 may be substantially the same in configuration. The node 4-1 includes a communication section 10, a data processing section 11, and a link quality calculation section 13. The node 4-1 includes an application processing section 14, an attribute judgment section 15, a route selection section 16, and a transmission data creation section 17.

The communication section 10 receives a packet from the hub 3 and the repeating devices 5. The communication section 10 outputs the received packet to the data processing section 11. The link quality calculation section 13 calculates the link quality between the hub 3 and the node 4-1. For example, the link quality calculation section 13 measures the RSSI (Received Signal Strength Indication) when the packet is received from the hub 3. The link quality calculation section 13 may calculate, based on the RSSI, the PER of the packet communication between the hub 3 and the node 4-1 as the packet communication link quality between the hub 3 and the node 4-1.

In the description given below, an example is used in which PER serves as an indicator of link quality between the hub 3 and the nodes 4, link quality between the hub 3 and the repeating devices 5, and link quality between the nodes 4 and the repeating devices 5. It should be noted, however, that this example is not intended to limit the indicator of link quality described in the present specification to PER. One of RSSI, SINR (Signal-to-Interference plus Noise power Ratio), BER (Bit Error Ratio), and PER or a combination of two or more of thereof may be used as link quality.

Similarly, the link quality calculation section 13 calculates the packet communication PERs between the repeating devices 5 and the node 4-1. The link quality calculation section 13 outputs the calculated PERs to the route selection section 16.

The communication section 10 receives a control packet from the repeating devices 5. The control packet may include PER information between the hub 3 and the repeating devices 5 as link qualities between the hub 3 and the repeating devices 5 calculated by the repeating devices 5. A control packet including PER information of the packet communication between the hub 3 and the repeating devices 5 may be, for example, a T-Poll frame described in IEEE802.15.6.

The communication section 10 outputs the received control packet to the data processing section 11. The data processing section 11 acquires the PER between the hub 3 and the repeating devices 5 from the control packet. The data processing section 11 outputs the acquired PER to the route selection section 16.

The application processing section 14 outputs, to the attribute judgment section 15, attribute information of data to be transmitted from the node 4-1 to the hub 3. The data transmitted from the node 4-1 to the hub 3 may be, for example, measurement data measured by a sensor circuit 106 which will be described later with reference to FIG. 9.

The attribute judgment section 15 determines a request for delay guarantee applied to this data transmission in accordance with data attribute information. In the description given below, a request for delay guarantee may be simply denoted as "request delay." The attribute judgment section 15 outputs request delay information to the route selection section 16.

For example, there may be two data attributes, for example, "urgent" that indicates that data is desirably transmitted urgently to the hub 3, and "normal" that indicates that data is other than "urgent" data. For example, there may be two types of request delay, namely, "mean delay reduction" for a packet and "significant delay reduction" for a packet. For example, the attribute judgment section 15 may select "significant delay reduction" as request delay to be applied to data having "urgent" as attribute. For example, the attribute judgment section 15 may select "mean delay reduction" as request delay to be applied to data having "normal" as attribute.

The route selection section 16 searches for a route that suits the request delay determined by the attribute judgment section 15 in accordance with the link quality calculated for each link. For example, when the request delay is "mean delay reduction," the route selection section 16 may search for a route whose mean delay meets a given condition.

For example, the route selection section 16 may search for a route whose mean delay is the smallest. For example, the route selection section 16 may select one of the routes whose mean delay is smaller than a given threshold. For example, the route selection section 16 may search for a route whose number of hops is the smallest of all the routes each of whose mean delay is smaller than a given threshold.

For example, when the request delay is "significant delay reduction," the route selection section 16 may search for a route whose probability of successful data transmission for a given number of attempts meets a given condition.

For example, the route selection section 16 may search for a route whose probability of successful data transmission for a given number of attempts is the largest. For example, the route selection section 16 may select one of the routes each of whose probability of successful data transmission for a given number of attempts is larger than a given threshold. For example, the route selection section 16 may search for a route with the smallest number of hops of all the routes each of whose probability of successful data transmission for a given number of attempts is larger than a given threshold.

The route selection section 16 outputs the searched route information to the transmission data creation section 17. The transmission data creation section 17 creates a packet including destination information created based on the route information. The data processing section 11 transmits the packet via the communication section 10 to the other party's apparatus specified by the destination information.

Figure 5:
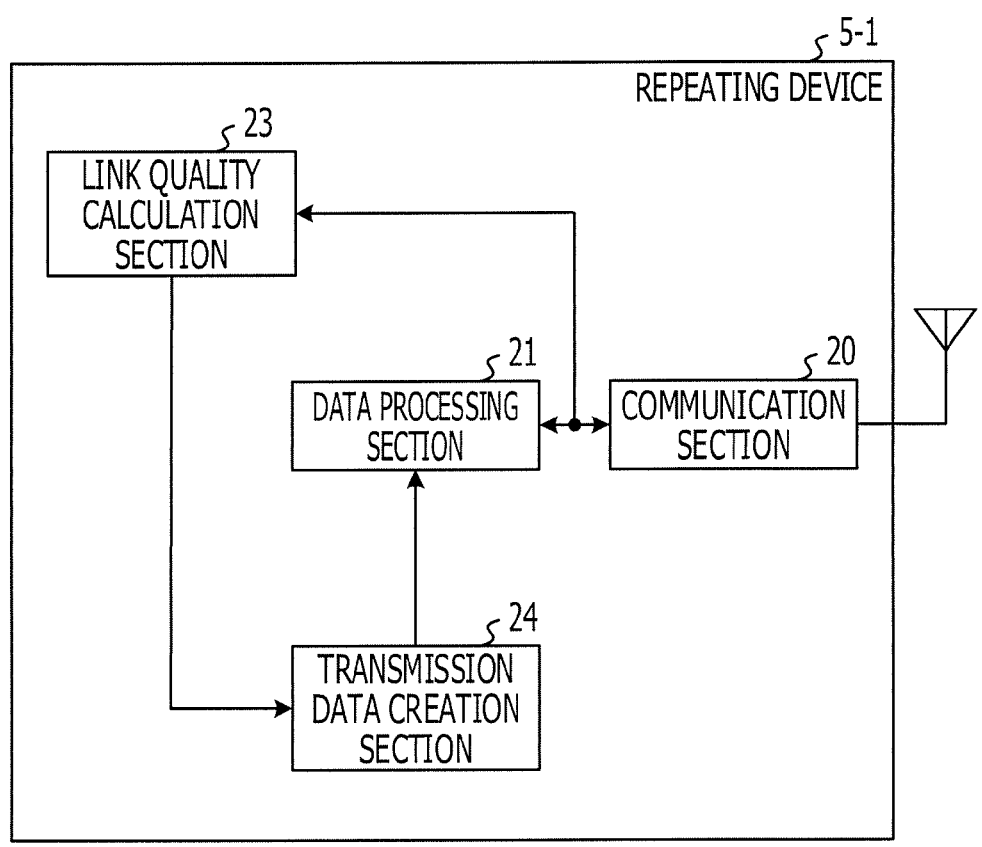
FIG. 5 is an explanatory diagram of an example of functional configuration of a repeating device.

FIG. 5 is an explanatory diagram of an example of functional configuration of a repeating device. The repeating device illustrated FIG. 5 may be the repeating device 5-1 illustrated in FIG. 3. The repeating device 5-2 may be substantially the same in configuration. The repeating device 5-1 includes a communication section 20, a data processing section 21, an RSSI measurement section 22, a link quality calculation section 23, and a transmission data creation section 24.

The communication section 20 receives a packet from the hub 3 and the nodes 4. The communication section 20 outputs the received packet to the data processing section 21. The data processing section 21 performs given data processing on the received packet.

The link quality calculation section 23 calculates the link quality between the hub 3 and the repeating device 5-1. For example, the link quality calculation section 23 may calculate the PER of the packet communication between the hub 3 and the repeating device 5-1 as the link quality. The link quality calculation section 23 outputs the link quality to the transmission data creation section 24. The transmission data creation section 24 creates a control packet including the link quality information. The transmission data creation section 24 transmits the control packet to the node 4-1 via the communication section 20.

<Description of Operation>

Figure 6:
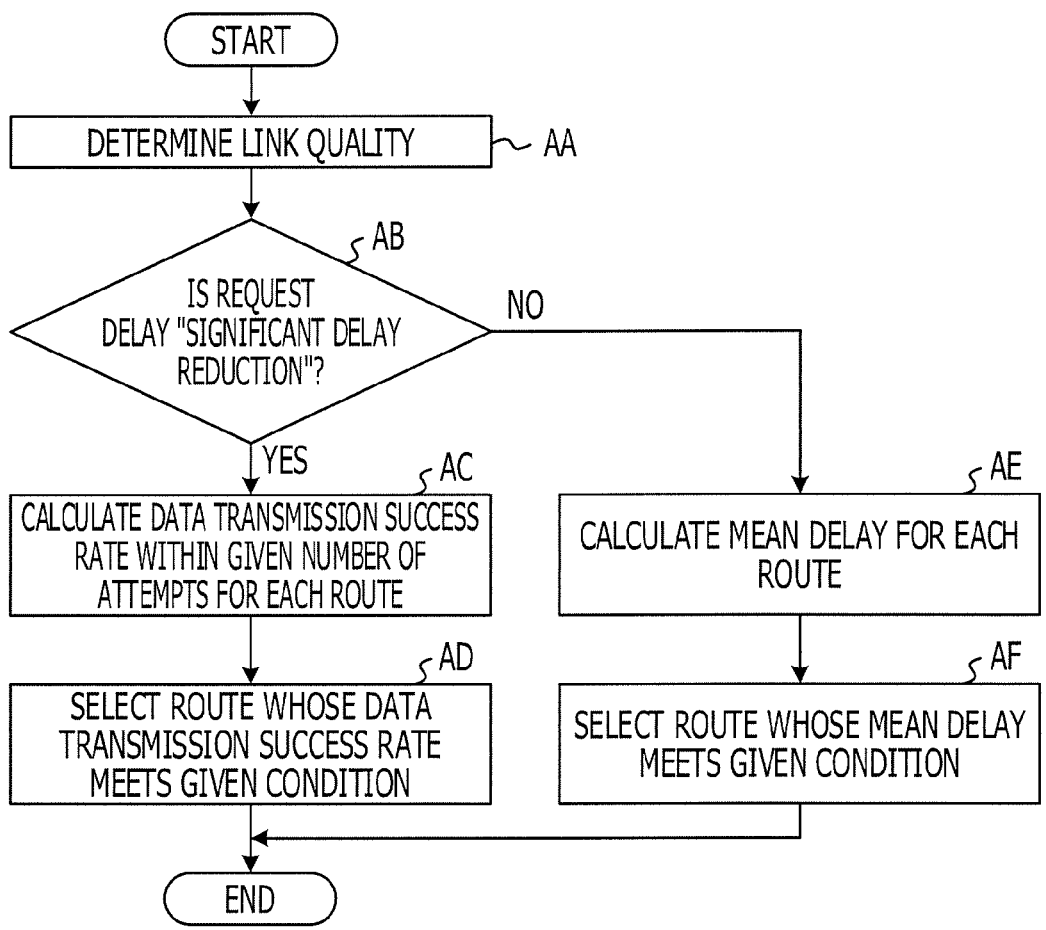
FIG. 6 is an explanatory diagram of an example of operation of a node.

FIG. 6 is an explanatory diagram of an example of operation of a node. The node 4-1 illustrated in FIG. 3 may perform the operation illustrated in FIG. 6. In operation AA, a link quality is determined for each of links on various routes anticipated between the hub 3 and the nodes 4. The quality of each of these links is determined as the link quality calculation section 13 calculates the link quality between the hub 3 and the node 4-1 and the link qualities between the node 4-1 and the repeating devices 5. The link qualities between the hub 3 and the repeating devices 5 are determined as the data processing section 11 acquires link quality information between the hub 3 and the repeating devices 5.

In operation AB, the attribute judgment section 15 judges, in accordance with the attribute of data to be transmitted, whether or not the request delay to be applied to transmission of this data is "significant delay reduction." If the request delay is "significant delay reduction" (Y in operation AB), the operation proceeds to operation AC. If the request delay is "mean delay reduction" (N in operation AB), the operation proceeds to operation AE.

In operation AC, the route selection section 16 calculates the probability of successful data transmission for a given number of attempts for each of routes anticipated between the hub 3 and the nodes 4 in accordance with the link quality determined in operation AA.

A description will be given below of an example of calculation method of probability of successful data transmission for a given number of attempts. Although a case is described for reasons of simplicity in which the number of hops between the hub 3 and the nodes 4 is two or less, the number of hops for multihop communication between the hub 3 and the nodes 4 in the present specification may be three or more.

Figure 7:
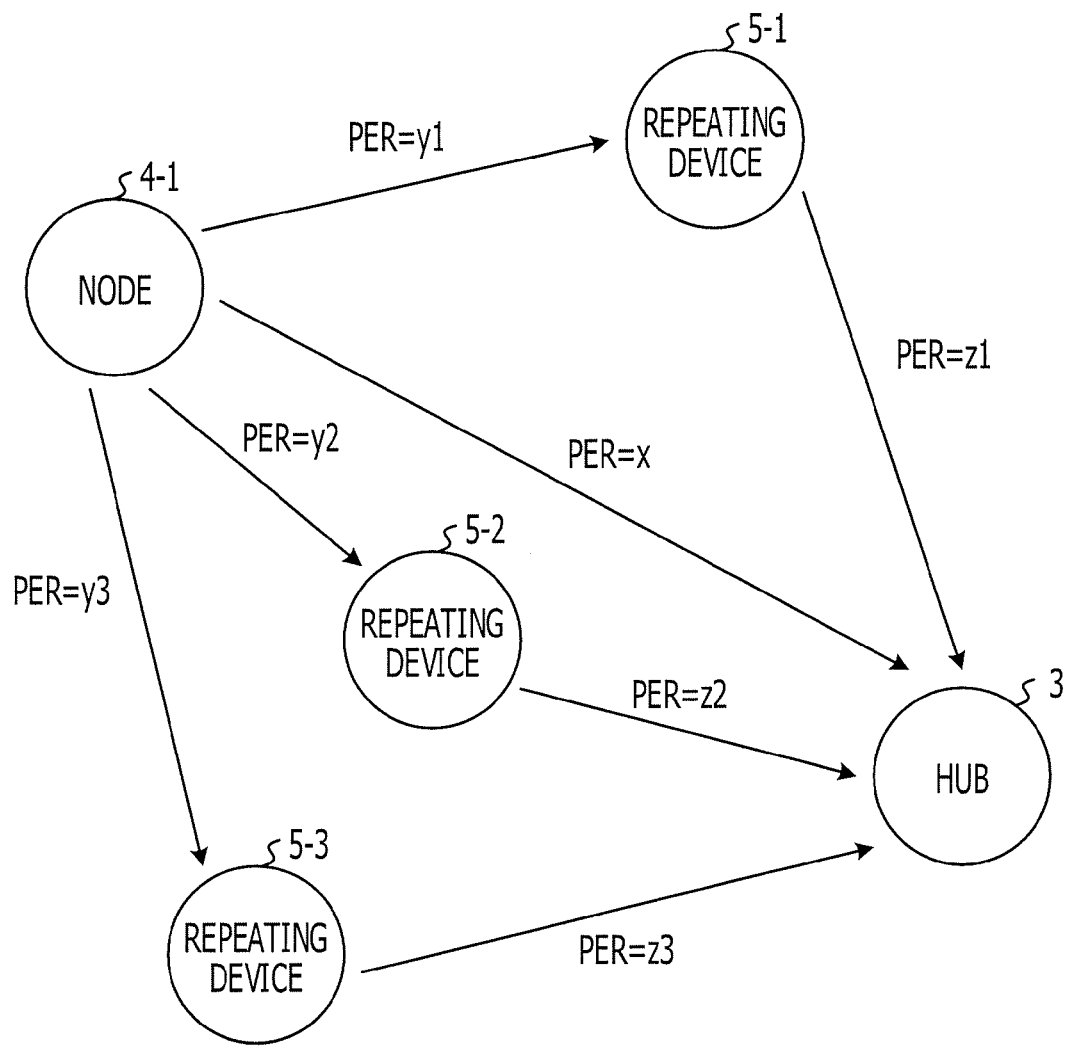
FIG. 7 is an explanatory diagram of an example of PER of a multihop network.

As illustrated in FIG. 7, the PER between the node 4-1 and the hub 3 is denoted as "x." On the other hand, the PER between the node 4-1 and a repeating device 5-$i$ is denoted as "yi" where i is one of integers 1, 2, 3, etc up to N, and where integer N is the number of repeating devices that can relay communication between the node 4-1 and the hub 3. The PER between the hub 3 and the repeating device 5-$i$ is denoted as "$zi$."

If a packet is transmitted directly from the node 4-1 to the hub 3 by bypassing the repeating devices 5, a probability pdf of unsuccessful data transmission for a given number of attempts m is $x^m$. Therefore, a probability pds of successful data transmission for the given number of attempts m is $(1-x^m)$.

If a packet is transmitted by way of the repeating device 5-$i$, a probability pif of unsuccessful data transmission for the given number of attempts m and a probability pis of successful data transmission for the given number of attempts m are given respectively by following Equations (1) and (2):

$$pif = yi^m + (1-yi)\Sigma_{k=1}^{m} yi^{k-1} zi^{m-k} \qquad (1)$$

$$pis = (1 - yi^m + (1-yi)\Sigma_{k=1}^{m} yi^{k-1} zi^{m-k}) \qquad (2)$$

In operation AD, the route selection section 16 searches for a route whose probability of successful data transmission for a given number of attempts meets a given condition. If a plurality of attempts is made to transmit the same data for retransmission following data transmission failure, the route selection section 16 may select, as a route for one of the second and succeeding data transmission attempts, a route different from the route used for the first transmission attempt. For example, routes to be searched for by the route selection section 16 may be "a combination of routes each of whose probability of successful data transmission for a given number of attempts meets a given condition if the same data is transmitted a plurality of times through a combination of a plurality of routes."

For example, routes to be searched for by the route selection section 16 may be a combination of two routes, one that bypasses the repeating devices 5 for the first data transmission attempt and another that passes through one of the repeating devices 5 for the second and succeeding data transmission attempts. The route selection section 16 may search for a combination of routes each of whose probability of successful data transmission for a given number of attempts meets a given condition of all these combinations of routes.

The transmission data creation section 17 creates a packet including destination information created based on route information. The data processing section 11 transmits the packet via the communication section 10 to the other party's apparatus specified by the destination information.

In operation AE, the route selection section 16 calculates the mean delay for each of the routes anticipated between the hub 3 and the nodes 4 in accordance with the link quality determined in operation AA. A mean delay dd for a route that transmits a packet directly from the node 4-1 to the hub 3 by bypassing the repeating devices 5 and a mean delay di for a route that transmits a packet by way of the repeating device 5-$i$ are given respectively by following Equations (3) and (4):

$$dd = \frac{1}{(1-x)} \qquad (3)$$

$$di = \frac{1}{(1-yi)} + \frac{1}{(1-zi)} \qquad (4)$$

In operation AF, the route selection section 16 searches for a route whose mean delay meets a given condition. If an attempt is made to transmit the same data a plurality of times for retransmission following data transmission failure, the route selection section 16 may select, as a route for one of the second and succeeding data transmissions, a route different from the route used for the first transmission attempt. For example, routes to be searched for by the route selection section 16 may be "a combination of routes each of whose mean delay meets a given condition if the same data is transmitted a plurality of times through a combination of a plurality of routes."

The transmission data creation section 17 creates a packet including destination information created based on route information. The data processing section 11 transmits the packet via the communication section 10 to the other party's apparatus specified by the destination information.

A route that meets request delay in accordance with the attribute of a packet to be transmitted may be selected. For example, if significant packet delay reduction is desired, a route is selected whose probability of successful data transmission for a given number of attempts is high. For other packets, on the other hand, a route may be selected whose mean delay is smaller.

Figure 8A:
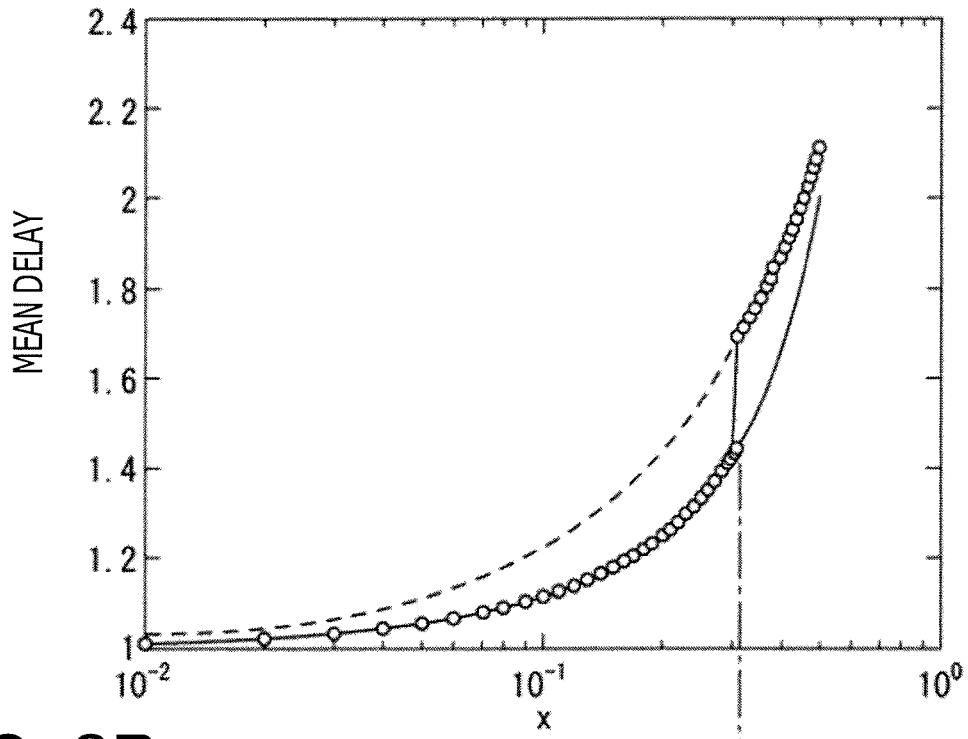
FIG. 8A is a graph to describe a difference in mean delay for different request delays.
Figure 8B:
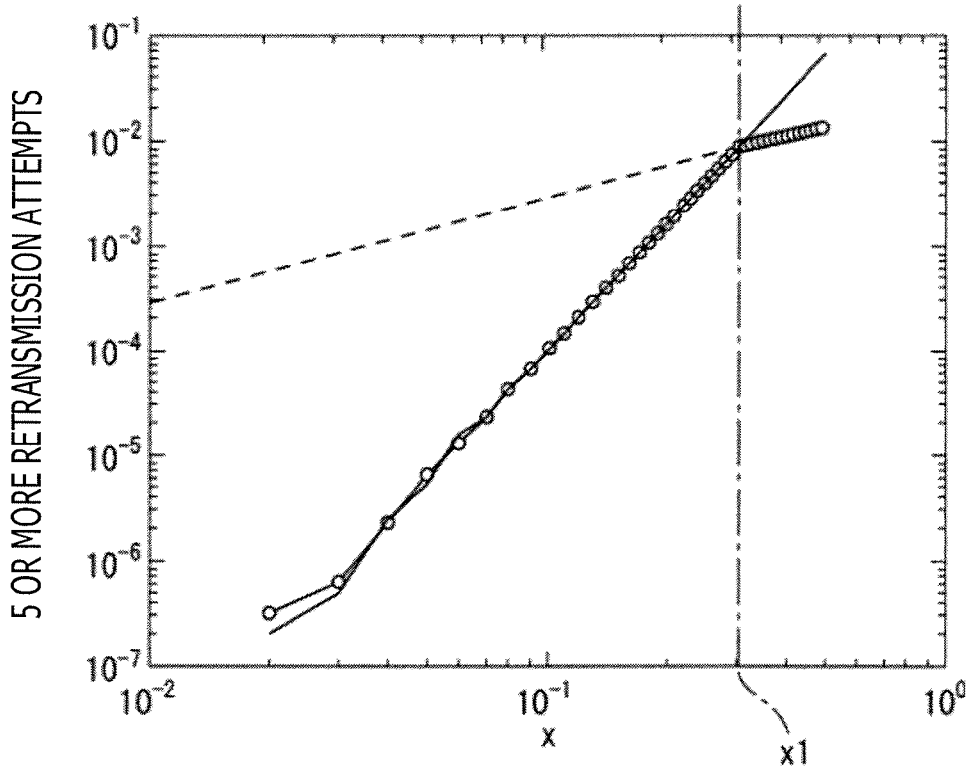
FIG. 8B is a graph to describe a difference in probability of occurrence of five or more errors for different request delays.

FIG. 8A is a graph to describe a difference in mean delay for different request delays. FIG. 8B is a graph to describe a difference in probability of occurrence of five or more errors for different request delays. The specification of PER is substantially the same as or similar to that in FIG. 1.

In FIG. 8A, the horizontal axis represents a PER "x" between a node 901 and a hub 902, and the vertical axis represents a mean delay. The solid line represents the mean delay for packet transmission only through routes that directly transmit a packet from the node 901 to the hub 902 by bypassing a repeating device 903. The dotted line represents the mean delay for packet transmission through a route that bypasses the repeating device 903 for the first transmission attempt and through routes that pass through the repeating device 903 for the second and succeeding transmission attempts in the event of failure of the first attempt.

In FIG. 8B, the horizontal axis represents the PER "x" between the node 901 and the hub 902, and the vertical axis represents the probability of occurrence of five or more errors. The solid line represents the probability thereof for packet transmission only through routes that directly transmit a packet from the node 901 to the hub 902 by bypassing the repeating device 903. The dotted line represents the probability thereof for packet transmission through a route that bypasses the repeating device 903 for the first transmission attempt and through routes that pass through the repeating device 903 for the second and succeeding transmission attempts in the event of failure of the first attempt.

In FIG. 8A, the mean delay for packet transmission only through routes that bypass the repeating device 903 is smaller than the mean delay for packet transmission through routes that pass through the repeating device 903 for the second and succeeding transmission attempts. Therefore, the solid lines in FIGS. 8A and 8B represent a graph of mean delay and a graph of probability of occurrence of five or more errors, respectively, when the packet data attribute is "normal" and the request delay is "mean delay reduction."

In the range where the value of "x" is smaller than x1, the probability of occurrence of five or more errors for packet transmission only through routes that bypass the repeating device 903 is smaller than the probability thereof for packet transmission through routes that pass through the repeating device 903 for the second and succeeding transmission attempts. In the range where the value of "x" is larger than x1, the probability of occurrence of five or more errors for packet transmission only through routes that bypass the repeating device 903 is larger than the probability thereof for packet transmission through routes that pass through the repeating device 903 for the second and succeeding transmission attempts.

When the packet data attribute is "urgent" and the request delay is "significant delay reduction," the route selection section 16 selects a route that transmits a packet by bypassing the repeating device 903 in the range where the value of "x" is smaller than x1. The route selection section 16 selects, in the range where the value of "x" is larger than x1, a route that bypasses the repeating device 903 as a route for the first transmission attempt and a route that pass through the repeating device 903 for the second and succeeding transmission attempts as a route for retransmission attempts. Therefore, the plotted lines in FIGS. 8A and 8B represent a graph of mean delay and a graph of probability of occurrence of five or more errors, respectively, when the packet data attribute is "urgent."

In the example illustrated in FIGS. 8A and 8B, depending on the data attribute, the mean delay is reduced up to approximately 20% when the mean delay takes on the value represented by the solid line as compared to the case represented by the plotted line in which mean delay occurs. Depending on the data attribute, the probability of occurrence of five or more errors is reduced approximately 75% when the probability thereof takes on the value represented by the plotted line as compared to the case in which the probability thereof takes on the value represented by the solid line.

The route selection section 16 may calculate, based on information other than link quality, mean delays and probabilities of successful data transmission for a given number of attempts. For example, the route selection section 16 may calculate, based on histories of transfer delays and retransmission attempts in the past, mean delays and probabilities of successful data transmission for a given number of attempts using a statistical processing.

On the other hand, the link quality calculation sections 13 and 23 may calculate PERs based on the ratio of the number of failed transmission attempts to the number of transmission attempts in the past. The link quality calculation sections 13 and 23 may calculate PERs based on BERs. If the PER between the hub 3 and the repeating device 5-1 is not acquired, the route selection section 16 may search for a route by assuming the PER value between the hub 3 and the repeating device 5-1 to be "0." The node 4-1 and the repeating device 5-1 may include an acceleration sensor and a camera to measure the traveling speed of the node 4-1, and a fading estimation section to estimate fading from the measured speed. The link quality calculation sections 13 and 23 may correct the link quality in accordance with the estimated fading.

The link quality calculation section 13 may intercept ACK (ACKnowledgement) and NACK (Negative ACKnowledgement) signals, which correspond to delivery confirmation signals for packet communication between the hub 3 and the repeating device 5-1, and calculate the PER between the hub 3 and the repeating device 5-1 based on the delivery confirmation signals. For example, the link quality calculation section 13 may calculate the PER in accordance with the ratio of the number of receptions of an ACK signal, which corresponds to an affirmative response signal, to the number of packet receptions between the hub 3 and the repeating device 5-1.

The data processing section 11 may acquire link quality information between the node 4-1 and the hub 3 from a control packet received from the other node 4-2 or 4-3 or the repeating device 5-2. For example, the other node 4-2 or 4-3 or the repeating device 5-2 may intercept a delivery confirmation signal between the node 4-1 and the hub 3 and calculate the link quality between the node 4-1 and the hub 3 based on the delivery confirmation signal. Similarly, the data processing section 11 may acquire link quality information between the node 4-1 and the repeating device 5-1 from a control packet received from the hub 3, the other node 4-2 or 4-3, or the repeating device 5-2.

The data processing section 11 may include a delay request reception section that receives specification information specifying request delay to be applied to a packet transmitted by the node 4-1 from the hub 3, the other node 4-2 or 4-3, or the repeating device 5-1 or 5-2. The route selection section 16 may search for a route in accordance with request delay specified by specification information received by the data processing section 11.

When the hub 3 transmits a packet to the nodes 4, a route may be similarly searched for in such a manner as to meet a different request delay in accordance with the attribute of data to be transmitted. For this reason, the hub 3 may include the same elements as the nodes 4. The repeating devices 5 may transmit, to the hub 3, a control packet including link quality information between the nodes 4 and the repeating devices 5. The nodes 4 may each include a delay request notification section that notifies the hub 3 of request delay information specifying delay request to be applied to a packet which is transmitted by the hub 3.

<Hardware Configuration>

Figure 9:
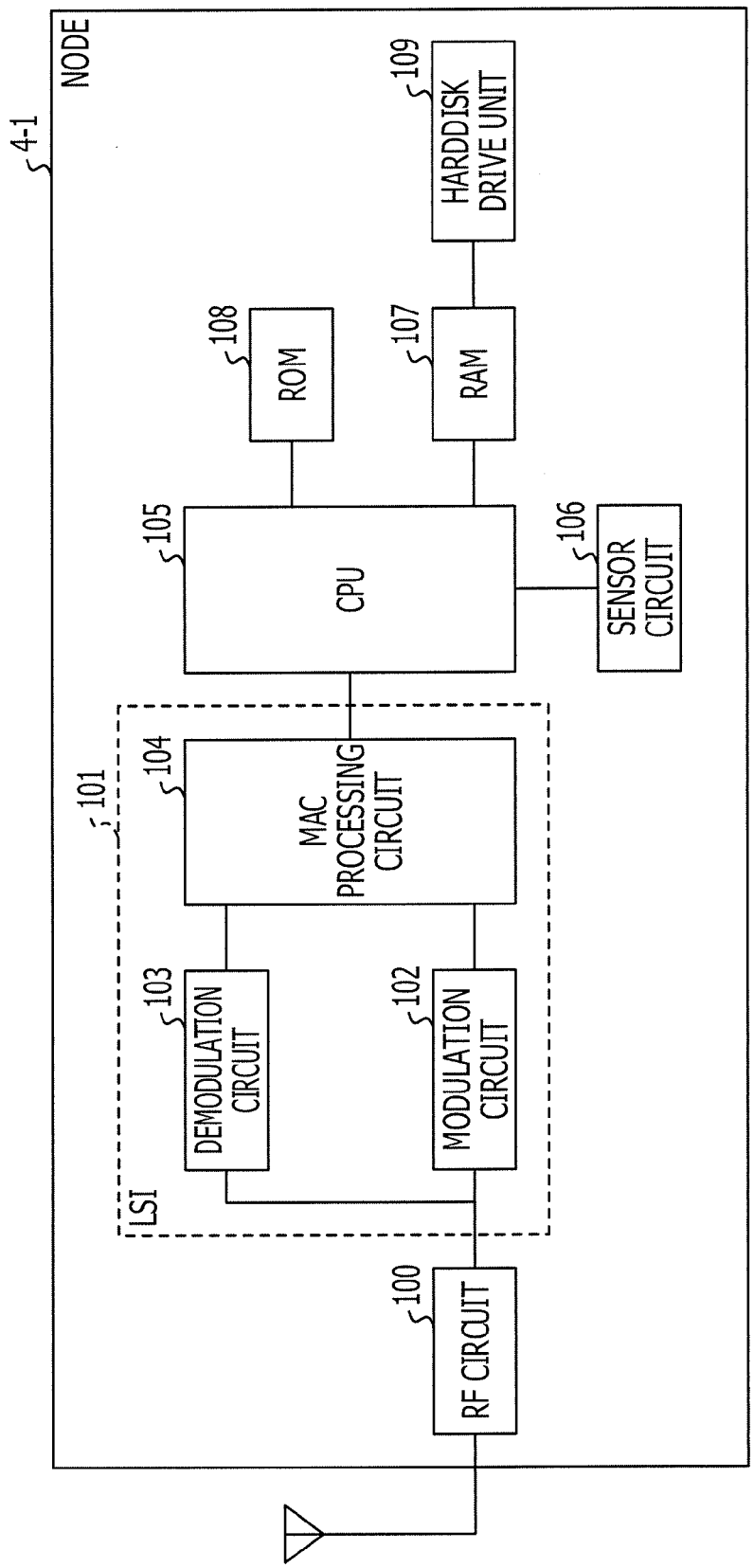
FIG. 9 is a hardware configuration diagram of an example of a node.

A description will be given next of hardware configurations of the node 4-1 and the repeating device 5-1. FIG. 9 is a hardware configuration diagram of an example of a node. The node 4-1 illustrated in FIG. 9 may be the node illustrated in FIG. 3. The node 4-1 includes a radio frequency circuit 100, an LSI (Large Scale Integration) 101, a CPU (Central Processing Unit) 105, and the sensor circuit 106. The node 4-1 includes a RAM (Random Access Memory) 107, a ROM (Read Only Memory) 108, and a harddisk drive unit 109. In the accompanying drawings, the radio frequency circuit may be denoted as the "RF circuit."

The LSI 101 may be a logic circuit that processes digital baseband signals. The LSI 101 may include a modulation circuit 102, a demodulation circuit 103, a MAC (Media Access Control) processing circuit 104 and so on, each made up of an ASIC (Application Specific Integrated Circuit), FPGA (Field-Programming Gate Array) or other circuit.

The above operation of the communication section 10 may be performed by the radio frequency circuit 100, the modulation circuit 102, and the demodulation circuit 103. The above operations of the data processing section 11 and the transmission data creation section 17 may be performed by the MAC processing circuit 104. The above operation of the link quality calculation section 13 may be performed by the demodulation circuit 103 and the CPU 105. The above operation of the application processing section 14 may be performed by the CPU 105 and the sensor circuit 106. The above operations of the attribute judgment section 15 and the route selection section 16 may be performed by the CPU 105.

Computer programs causing the CPU 105 to perform the above operations are stored in the ROM 108 and/or the harddisk drive unit 109. These computer programs may be installed from a computer-readable portable recording medium to the harddisk drive unit 109 using, for example, a well-known setup program.

Figure 10:
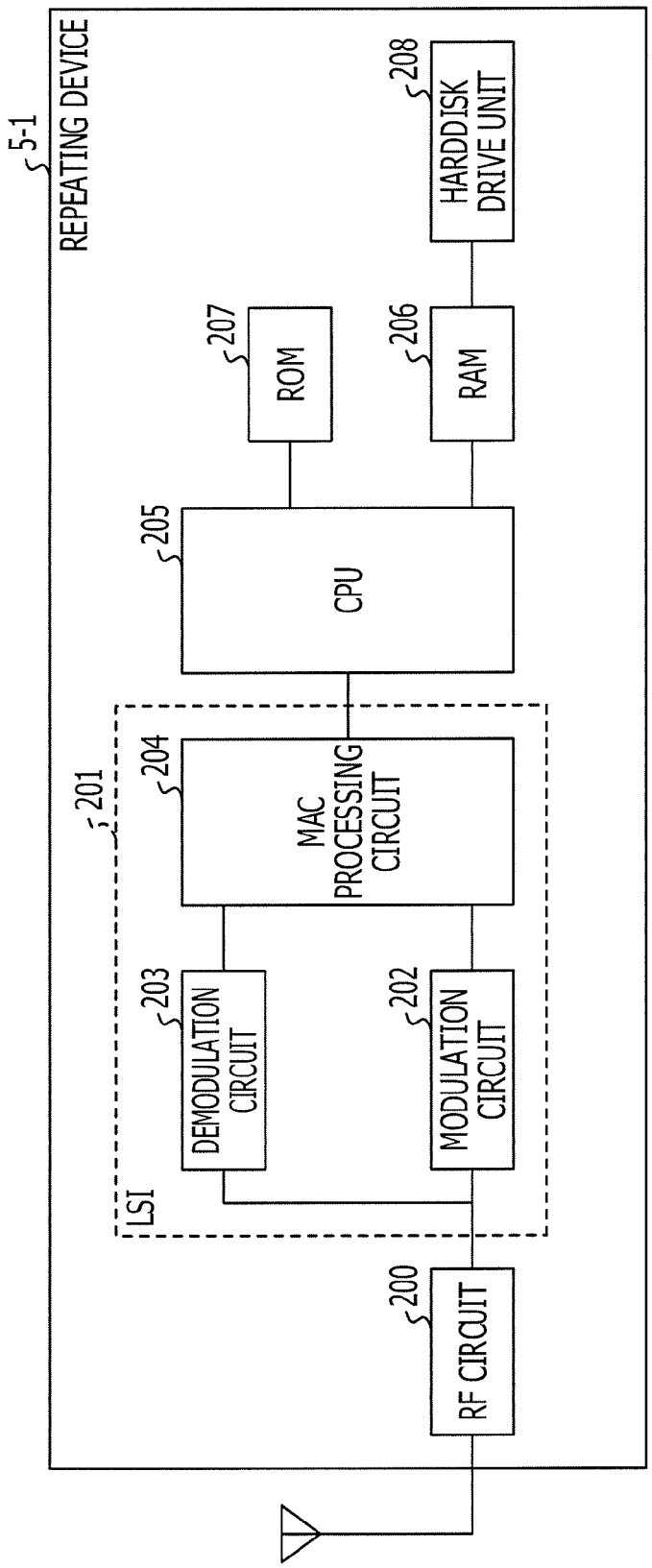
FIG. 10 is a hardware configuration diagram of an example of a repeating device.

FIG. 10 is a hardware configuration diagram of an example of a repeating device. The repeating device 5-1 illustrated in FIG. 10 may be the repeating device illustrated in FIG. 3. The repeating device 5-1 includes a radio frequency circuit 200, an LSI 201, a CPU 205, a RAM 206, a ROM 207, and a harddisk drive unit 208.

The LSI 201 may be a logic circuit that processes digital baseband signals. The LSI 201 may include a modulation circuit 202, a demodulation circuit 203, and a MAC processing circuit 204, each made up of an ASIC, FPGA or other circuit.

The above operation of the communication section 20 may be performed by the radio frequency circuit 200, the modulation circuit 202, and the demodulation circuit 203. The above operations of the data processing section 21 and the transmission data creation section 24 may be performed by the MAC processing circuit 204. The above operation of the link quality calculation section 23 may be performed by the demodulation circuit 203 and the CPU 205.

Computer programs causing the CPU 205 to perform the above operations are stored in the ROM 207 and/or the harddisk drive unit 208. These computer programs may be installed from a computer-readable portable recording medium to the harddisk drive unit 208 using, for example, a well-known setup program.

It should be noted that the hardware configurations depicted in FIGS. 9 and 10 are merely illustrative for purposes of description. The node 4-1 and the repeating device 5-1 described in the present specification may have any other hardware configuration as long as the node 4-1 and the repeating device 5-1 can perform the above operations. The functional configuration diagrams in FIGS. 4 and 5 illustrate the configurations with focus on the portions of the configurations related to the functions described in the present specification. The node 4-1 and the repeating device 5-1 may each include elements other than those illustrated in FIGS. 4 and 5. The series of operations described with reference to FIG. 6 may be interpreted as a method including a plurality of procedures. In this case, "operations" may be replaced by "steps."

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication apparatus comprising:
   a judgment section configured to judge a request for delay guarantee for data transmission;
   a route selection section configured to:
   calculate, when the request is a first request requesting normal data transmission, a mean delay time for each of routes available between the communication apparatus and a second communication apparatus which are in a network of wireless communication and select a first route including the mean delay time meeting a first condition from the routes; and
   calculate, when the request is a second request requesting urgent data transmission, a probability of successful data transmission within a given number of transmissions for each of the routes, and select a second route including the probability of successful data transmission within the given number of transmissions meeting a second condition; and
   a transmission section configured to transmit the data to one of the first route and the second route.

2. The communication apparatus according to claim 1 comprising:
   a link quality calculation section configured to calculate a link quality of link of the routes,
   wherein the route selection section calculates, based on the link quality, the mean delay time and the probability of successful data transmission.

3. The communication apparatus according to claim 2, wherein the link quality is at least one of a received signal strength indication (RSSI), a signal-to-interference plus noise power ratio (SINR), a bit error ratio (BER), a Packet Error Ratio (PER), and a combination of two or more of thereof.

4. The communication apparatus according to claim 1 comprising:
   a link quality reception section configured to receive information about the link quality of link of the routes from another communication apparatus in the network other than the communication apparatus,
   wherein the route selection section calculates, based on the link quality, the mean delay time and the probability of successful data transmission.

5. The communication apparatus according to claim 4, wherein the another communication apparatus is at least one of the second apparatus and a repeating device configured to relay communication between the communication apparatus.

6. The communication apparatus according to claim 4, wherein the another communication apparatus is a communication apparatus other than the second communication apparatus and a repeating device configured to relay communication between the communication apparatus and the second communication apparatus.

7. The communication apparatus according to claim 1, wherein the judgment section judges the request in accordance with an attribute of the data.

8. The communication apparatus according to claim 1 comprising:
   a request reception section configured to receive information of the request for delay guarantee from another communication apparatus in the network,
   wherein the judgment section judges the request for delay guarantee for the data transmission in accordance with the information of the request for delay guarantee.

9. The communication apparatus according to claim 1, wherein, when the request is the second request and the same data is transmitted a plurality of times through a combination of a plurality of routes, the route selection section selects the combination of routes if a probability of successful data transmission for a given number of transmissions meets a condition.

10. The communication apparatus according to claim 1, wherein the first condition includes at least one of a condition where the mean delay is the smallest, a condition where the mean delay is smaller than a given threshold, and a condition where number of hops is the smallest among routes each having the mean delay smaller than the given threshold.

11. The communication apparatus according to claim 1, wherein the second condition includes at least one of a condition where the probability of successful data transmission within the given number of transmissions is larger than a given threshold, and a condition where number of hops is the smallest among routes each having the probability of successful data transmission within the given number of transmissions larger than the given threshold.

12. A wireless communication network system including a first communication apparatus which communicates with a second communication apparatus,
   wherein the first communication apparatus comprises:

a judgment section configured to judge a request for delay guarantee for data transmission;

a route selection section configured to:

calculate, when the request is a first request requesting normal data transmission, a mean delay time for each of routes available between the first communication apparatus and the second communication apparatus and select a first route including the mean delay time meeting a first condition from the routes; and calculate, when the request is a second request requesting urgent data transmission, a probability of successful data transmission within a given number of transmissions for each of the routes, and select a second route including the probability of successful data transmission within the given number of transmissions meeting a second condition; and a transmission section configured to transmit the data to one of the first route and the second route.

13. The wireless communication network system according to claim 12, wherein the first condition includes at least one of a condition where the mean delay is the smallest, a condition where the mean delay is smaller than a given threshold, and a condition where number of hops is the smallest among routes each having the mean delay smaller than the given threshold.

14. The wireless communication network system according to claim 12, wherein the second condition includes at least one of a condition where the probability of successful data transmission within the given number of transmissions is larger than a given threshold, and a condition where number of hops is the smallest among routes each having the probability of successful data transmission within the given number of transmissions larger than the given threshold.

15. A communication method including:

judging a request for delay guarantee for data transmission;

calculating, when the request is a first request requesting normal data transmission, a mean delay time for each of routes available between a communication apparatus and a second communication apparatus which are in a network of wireless communication and selecting a first route including the mean delay time meeting a first condition from the routes;

calculating, when the request is a second request requesting urgent data transmission, a probability of successful data transmission within a given number of transmissions for each of the routes, and selecting a second route including the probability of successful data transmission within the given number of transmissions meeting a second condition; and transmitting the data to one of the first route and the second route.

16. The communication method according to claim 12, wherein the first condition includes at least one of a condition where the mean delay is the smallest, a condition where the mean delay is smaller than a given threshold, and a condition where number of hops is the smallest among routes each having the mean delay smaller than the given threshold.

17. The communication method according to claim 15, wherein the second condition includes at least one of a condition where the probability of successful data transmission within the given number of transmissions is larger than a given threshold, and a condition where number of hops is the smallest among routes each having the probability of successful data transmission within the given number of transmissions larger than the given threshold.

\* \* \* \* \*